US006385969B1

(12) United States Patent
Huber

(10) Patent No.: US 6,385,969 B1
(45) Date of Patent: May 14, 2002

(54) ARRANGEMENT FOR HYDRAULIC ACTUATION OF A MOVABLE COMPONENT ON A VEHICLE

(75) Inventor: Gerhard Huber, Frankenhofen (DE)

(73) Assignee: Hoerbiger Hydraulik GmbH, Schongau (DE)

( * ) Notice: Subject to any disclaimer, the term of this patent is extended or adjusted under 35 U.S.C. 154(b) by 0 days.

(21) Appl. No.: 09/658,489

(22) Filed: Sep. 8, 2000

(30) Foreign Application Priority Data

Sep. 10, 1999 (AT) .......................................... 1552/99

(51) Int. Cl.[7] ........................................ F16D 31/02
(52) U.S. Cl. ........................................ 60/413; 60/481
(58) Field of Search .................... 60/481, 413; 92/134; 91/491; 296/146.4, 76, 112, 113

(56) References Cited

U.S. PATENT DOCUMENTS 2,099,368 A * 11/1937 Levy ........................ 60/481
3,570,244 A * 3/1971 Strobel et al. ............... 60/481
3,891,126 A * 6/1975 Segawa ...................... 92/134
4,036,405 A * 7/1977 Mombaecher ............... 60/481
5,921,604 A * 7/1999 Yu et al. ................. 296/146.4
6,220,026 B1 * 4/2001 Ritter ........................ 60/481

* cited by examiner

*Primary Examiner*—F. Daniel Lopez
*Assistant Examiner*—Igor Kershteyn
(74) *Attorney, Agent, or Firm*—Dykema Gossett PLLC

(57) ABSTRACT

An apparatus for hydraulic actuation of a movable component on a vehicle, for example a trunk lid, a cover or the like, includes at least one double-action hydraulic working cylinder (1) which is attached on one side to the vehicle and on the other side to the movable component, one of its working chambers (3) being connected to a passive hydraulic accumulator (4) and the other working chamber (7) being connected to a hydraulic pump (8), and a line branches off to a tank (9) between the pump and the working cylinder and into which line there is a pressure relief valve inserted. In order to reduce especially in a simple and safe manner the danger of personal injury and damage to the vehicle or other objects, there is a check valve (11) blocking in the direction of the pump (8), which is inserted between the pump (8) and the working cylinder (1), and there branches off a line leading to the tank (9) between the check valve (11) and the working cylinder (1), and in which line there is an electrically-controllable proportional pressure valve (13) inserted as a pressure relief valve.

6 Claims, 1 Drawing Sheet

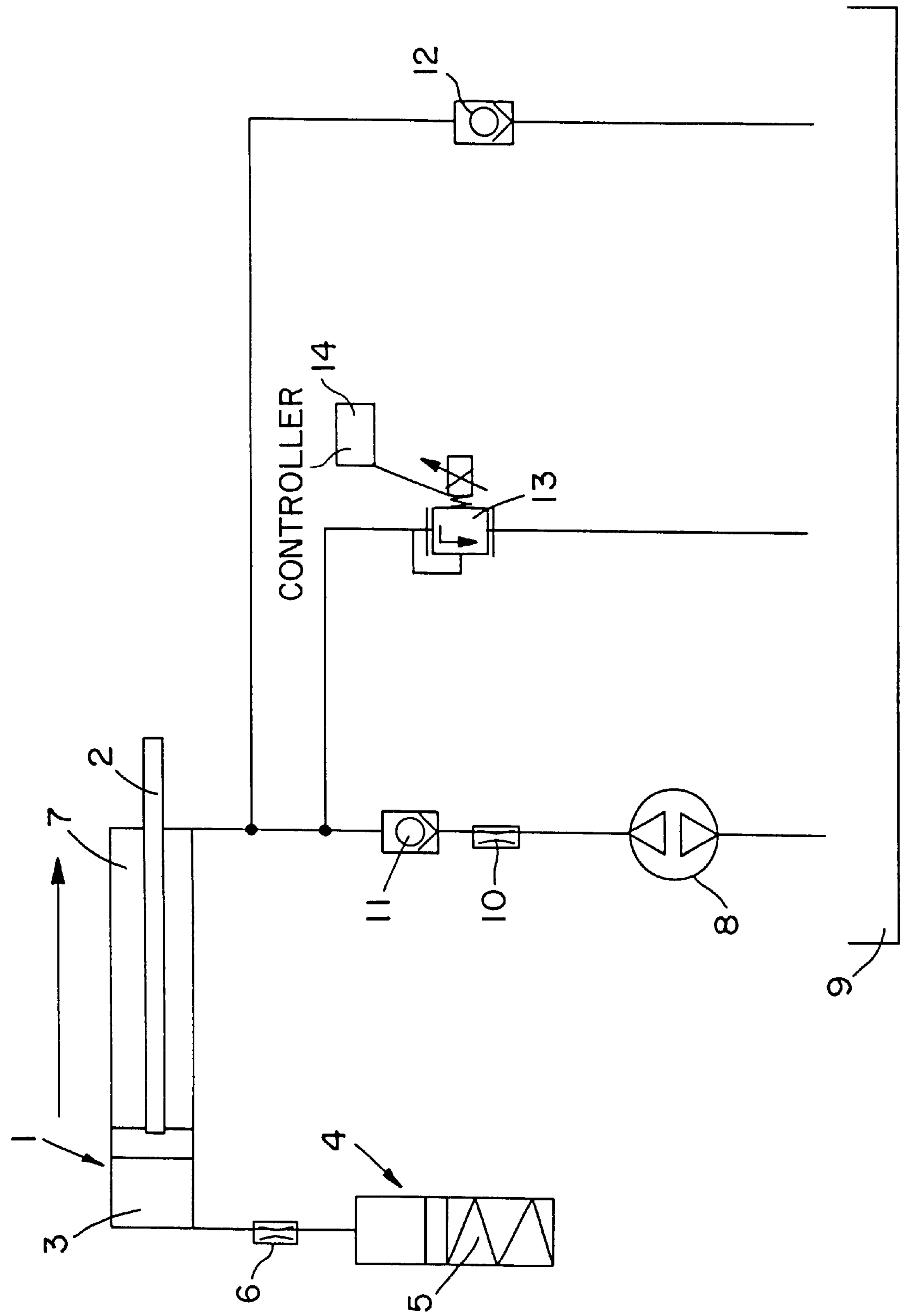
CONTROLLER
1
2
3
4
5
6
7
8
9
10
11
12
13
14

ARRANGEMENT FOR HYDRAULIC ACTUATION OF A MOVABLE COMPONENT ON A VEHICLE

BACKGROUND OF THE INVENTION

1. Field of the Invention

The invention relates to an arrangement for hydraulic actuation of a movable component on a vehicle, for example a trunk lid, a cover or the like, having at least one double-action hydraulic working cylinder, which is attached on one side to the vehicle and on the other side to the movable component whereby one of its working chambers is connected to a passive hydraulic accumulator and the other working chamber is connected to a hydraulic pump, and whereby a line branches off to the tank between said pump and said working cylinder, and into which line there is a pressure relief valve inserted. The invention relates also to a method for hydraulic actuation of a movable component on a vehicle, for example a trunk lid, a cover or the like, through pressurizing a working chamber of a double-action hydraulic working cylinder with a passive hydraulic accumulator and through pressurizing the opposite working chamber of the working cylinder with a hydraulic pump whereby said working cylinder is attached on one side to the vehicle and on the other side to the movable component.

2. The Prior Art

An arrangement and method of this type is known from DE 197 40 029, for example. The passive hydraulic accumulator is therein connected on the piston-side with the working chamber of the working cylinder and in case of a blocked connection between the pump and the working chamber on the rod-side, the pressurization with the hydraulic accumulator effects the outward movement of the working cylinder and thereby the opening of the trunk lid of a vehicle, for example. To close the trunk lid, the connection is opened between the pump and the rod-side working chamber of the cylinder so that the working cylinder retracts and the passive hydraulic accumulator is again simultaneously pressurized.

However, one disadvantage with the described positioning system is the fact that during opening of the trunk lid, the full force of the hydraulic accumulator is released, which causes a very high force at least in partial segments of the opening movement range should an object or a body part of a person be caught in the pivoting path of the trunk lid. Even during impact of the trunk lid onto a solid obstacle, the strong forces of the hydraulic accumulator lead to a considerable danger of damage to the vehicle or the obstacle.

U.S. Pat. No. 4,727,791 discloses a system for the control of a hydraulic single-action cylinder adapted for actuation of vehicle clutches wherein the piston speed of the cylinder may be controlled by two controllable proportional pressure valves. An electronic controllable shut-off valve and a first proportional pressure valve are disposed between the pump of the hydraulic system and the working cylinder whereby the working cylinder is influenced exclusively by the force of the clutch spring on the opposite side of the pump. The second proportional pressure valve is disposed in a line leading to the tank, which branches off from the cylinder supply line between the first proportional pressure valve and the working cylinder precise speed control and stopping of the piston in any desired position is achieved with this very complicated and costly arrangement while safety aspects, emergency operation of the cylinder, and a precise control range of force conditions on the cylinder are not taken into consideration.

In JP 06040233 there is also disclosed a controllable proportional pressure valve used for speed control of the movement of a working cylinder in the height adjustment of a vehicle suspension. However, this proportional pressure valve is disposed in a line that branches off between the pump and an electric controllable shut-off valve that leads to the tank, whereas the working cylinder is located just behind said shut-off valve. The cylinder is here also influenced only by the weight of the vehicle on the opposite side of the pump and the proportional pressure valve is inoperable after closing of the shut-off valve and after completion of the height adjustment process and therefore it cannot assume any safety functions or allow an emergency operation.

The pressure control is designed very similar in this respect in JP 4238993 wherein the maximum pressure may be adjusted by means of a proportional pressure valve but whereby no safety and emergency operations of any kind can be realized. This applies also to the speed control in the remote control operation of a crane according to DE 29 52 963.

It is therefore the object of the invention to improve the type of arrangement and method described above so that the described disadvantages are avoided and that especially the danger of personal injury or damage to the vehicle or other objects may be reduced in a simple and safe manner.

SUMMARY OF THE INVENTION

This object is achieved according to the invention in that a check valve is inserted between the pump and the working cylinder blocking in the direction of the pump and whereby a line branches off to the tank between the check valve and the working cylinder and in which line there is installed an electric controllable proportional pressure valve as a pressure relief valve. The proportional pressure valve is a component in which the pressure is proportional to the controlled electric current supplied. Thereby the flow-through pressure in the proportional pressure valve may be kept always slightly higher or lower in a simple manner for the reciprocal movement of the working cylinder through a suitable supply of electric current as it corresponds to the pressure of the hydraulic accumulator. Thus there is of course to be considered the own weight of the actuated component, which according to kinematics mostly acts against the force of the hydraulic accumulator, but it could also work together with this force. Thereby only the differential pressure between the hydraulic accumulator and the pressure determined by the proportional pressure valve affects the vehicle component to be moved on the opposite side and whereby, depending on the effect of the weight of the component, the corresponding pressure must be added to one of the mentioned pressures. In the following, the weight of the component will no longer be explicitly mentioned but it is naturally to be considered in the above sense in all statements about pressure conditions in the system. In general, forces influencing the component may be kept very low, which possibly becomes a factor in case of impact onto an obstacle or when catching a person or objects. The check valve, which is blocking in the direction of the pump and which is inserted between the pump and the fork of the line leading to the tank (in which line there is also inserted the proportional pressure valve), prevents the cylinder from moving in an outward direction in a non-actuated system based on the always-occurring leakage of the pump whereby an unintentional movement of the moved component is prevented, for instance the unwanted opening of a trunk lid. Since the proportional pressure valve controls the pressure in the system between the check valve and the working cylinder, said proportional pressure valve may fulfill its safety function at any time by limiting the maximum pressure in the system.

The proportional pressure valve is designed as a closed valve when without electric power, according to the invention, to avoid unwanted actuation of the component on the vehicle at least in one direction in case of electric power failure.

To guarantee during emergency manual operation and in case of hydraulic pump failure that the displaced component does not immediately spring back into the position in which it was before the pump failure, there branches off a line to the tank between the working cylinder and the fork of the line, in which line the proportional pressure valve is installed, and in which a post-suction check valve is placed blocking in the direction of the tank. Thereby hydraulic fluid may be moved manually through suction from the tank into the working cylinder and after releasing the component, it remains fixed in position because of the now locked post-suction check valve and the preferably closed proportional pressure valve being without electric power.

The passive hydraulic accumulator is advantageously designed as a spring-operated accumulator to make the arrangement independent on the current surrounding temperatures.

According to an additional characteristic of the invention, there are control electronics provided in which a program is stored for a varying electric power supply to the proportional pressure valve to adapt to the changing conditions in the hydraulic accumulator and/or the kinematics of the component that is moved above the working cylinder. During movement of the trunk lid or the like, the least possible excessive force is thereby guaranteed for the movement and guaranteed is thereby also the optimum passive protection against danger of injury by clamping down or damage to objects.

The object stated in the beginning is achieved by the method for hydraulic actuation of a movable component on a vehicle in that during the forward movement of the working cylinder, the pressure in the opposite working chamber is kept at a low range below the pressure of the hydraulic accumulator. Thereby only a very low differential pressure influences the component to be moved on the vehicle, namely the one between the hydraulic accumulator and the pressure determined by the proportional pressure valve on the opposite side, which is made available for the retracting movement of the pump, so that the forces at the component may be kept very low.

With the same effect and as just described, there is proposed in the method for hydraulic actuation of a movable component on a vehicle, according to an additional characteristic of the invention, that during the return movement of the working cylinder, the pressure in the working chamber that is connected to the pump is kept at a low range above the pressure of the hydraulic accumulator.

In the following description, the invention is described in more detail as shown in the illustrated embodiment example with the aid of the attached schematic hydraulic diagram.

For actuation of a movable component on a vehicle, for example a trunk lid or the like, there is provided a working cylinder 1, which is mounted with one end on the vehicle, preferably on the floor, and with the other end on the moving part, which means the piston rod 2. In place of the direct attachment of the working cylinder 1 at both sides, which of course requires correspondingly movable lines or a hydraulic system that may be completely moved together with the working cylinder 1, attachment of the working cylinder 1 may be performed on the vehicle-side and/or component-side or also directly via a lever or a hinge arrangement or the like, whereas the working cylinder 1 could also be mounted rigidly relative to the vehicle.

A passive hydraulic accumulator 4, with the least possible dependence on temperature because of its spring 5, is connected with a line to the piston-side working chamber 3 of the working cylinder 1 and in which line there is a nozzle valve 6 inserted as a throttle element.

The rod-side working chamber 7 of the working cylinder 1 is supplied with a hydraulic medium from the tank 9 by the pump 8 whereby there is also inserted a nozzle valve 10 as a throttle element in the connecting line between the pump 8 and the working cylinder 1 whereby a check valve 11 is blocking in the direction of said pump 8. The check valve 1 has the effect that the working cylinder 1 can move when the system is not actuated based on the always-occurring leakage of the pump. The working cylinder 1 moves in the direction of the exiting piston rod 2, which is in most cases of application the opening direction of the trunk lid or the like.

Two additional lines branch off to the tank 9 between the check valve 11 and said working cylinder whereby a post-suction check valve 12 is inserted in one of these lines. When the system is switched off or broken down, the component may of course be moved manually whereby the hydraulic medium is suctioned from the tank 9 to the rod-side working chamber 7 by means of a check valve 12. The trunk lid or the like is held in the position reached through manual operation by the blocking action of the check valve 12 in the direction of the tank 9.

An electrically-controllable proportional pressure valve 13 with control means 14 is inserted into the line whereby the valve 13 has various threshold values depending on the degree of electric current, which in turn determines thereby the pressure level in the rod-side working chamber 7 of the working cylinder 1. To open the trunk lid or the like to pushing out the piston rod 2 of the working cylinder 1, the proportional pressure valve 13 is controlled in such a manner that the corresponding flow-through threshold value is just slightly lower than the pressure in the hydraulic accumulator 4. The accumulator produces therefore only the counter pressure necessary for the opening process. The supply of electric current to the proportional pressure valve 13 can be advantageously changed via an electronic control in such a manner that, on one hand, changes of the pressure levels of the hydraulic accumulator 4 may be taken into consideration during the exiting (of the piston rod). Considered may be also the various forces based caused by the changing geometrical conditions in the movement process. The electronic controls control for example the proportional pressure valve 13 with the electric current, which gives the just necessary force for opening and/or closing the cover or the like in conjunction with the pressure of the hydraulic accumulator 4; however, there is no excess force as it is the case in traditional systems with designs having maximum necessary pressure at a large range of the pivoting or shifting path (of the cover). The electronic controls control the proportional pressure valve depending on the angle of the cover, which is determined by path angle, or inclination meters or from which signals computations are made in the control electronics. The corresponding control curve may be preferably determined empirically and subsequently stored in the control electronics. Thereby, an optimum passive protection against injury by closing is achieved whereby different pressure conditions for opening and closing may be taken into consideration, for example, based on the assistance of the closing movement through the weight of the cover. The pressure limiting valves (relief valves) necessary in traditional actuation arrangements may thereby be omitted.

To close the trunk lid or the like, which means in the illustrated example to retract the working cylinder 1, the pump 8 is actuated and the proportional pressure valve 13 is controlled with only so much electric current that the pressure in the rod-side working chamber 7 lies just a little over the pressure in the piston-side working chamber 3, which in turn is determined by the hydraulic accumulator.

A typical control curve will provide a higher supply of electric current to the proportional pressure valve 13 at the beginning of the opening movement so that the exiting (of the piston rod) and the overcoming of the start resistance is accomplished with a higher force. Kinematics and leverage conditions are also rather unfavorable at the beginning so that a higher force is necessary. The pressure and the thereby created force are adjusted to a value that is just sufficient to perform or continue the opening movement in the respective phases. Unnecessary excessive forces are avoided that would lead to damages in case of obstacles in the movement path of the cover or to injuries. As soon as the cover is in motion and kinematics as well as leverage conditions are also more favorable, then the pressure and thereby also the actuation force is throttled and the proportional pressure valve 13 is supplied with less electric current. At the end of the pivoting motion (of the cover), kinematics will usually become more favorable and the influence of the weight of the cover plays mostly only a secondary role since it is substantially in an unstable state of balance. The blocking value of the proportional pressure valve 13 is therefore raised according to the pressure in the system but not to the high degree as at the start of the motion.

The same conditions are logically present in reversed order during closing whereby, however, it is to be considered that the lowering of the cover is assisted by its weight, but on the other side, the resistance of the spring 5 in the hydraulic accumulator has to be overcome.

The proportional pressure valve 13 is advantageously designed as a closed valve when without electric power whereby even during electric power failure, the holding function of the working cylinder 1 is guaranteed and an unintentional opening of the trunk lid or the like is prevented.

An element may be provided advantageously when needed in the connecting line between the proportional pressure valve 13 and the tank 9 whereby said element is preferably a nozzle to control the volume flow of the hydraulic medium and thereby also the speed of one or all working cylinders 1.

I claim:

1. An apparatus for moving a movable component relative to a vehicle, said apparatus comprising a double-action hydraulic working cylinder which is connectable to said vehicle and said component, said working cylinder defining a piston chamber and a rod chamber,

- a hydraulic accumulator connected to said working cylinder to supply hydraulic fluid to said piston chamber thereof,
- a hydraulic storage tank,
- a first hydraulic line connected between said hydraulic storage tank and said rod chamber of said working cylinder, said first hydraulic line including a pump and a first check valve which allows hydraulic fluid flow through said pump only in a direction to said rod chamber, and
- a second hydraulic line connected between said hydraulic storage tank and said first hydraulic line between said check valve and said rod chamber, said second hydraulic line including an electrically-controllable proportional pressure valve to enable hydraulic fluid to flow from said rod chamber to said hydraulic storage tank.

2. An apparatus according to claim 1, wherein said proportional pressure valve can prevent hydraulic fluid flow from said rod chamber to said hydraulic tank.

3. An apparatus according to claim 1, including a third hydraulic line connected between said hydraulic tank and said first hydraulic line between a location where said second hydraulic line connects thereto and said rod chamber, said third hydraulic line including a second check valve which blocks hydraulic fluid flow from said rod chamber to said hydraulic tank.

4. An apparatus according to claim 1, wherein said passive hydraulic accumulator includes a spring to pressurize hydraulic fluid therein.

5. An apparatus according to claim 1, including an electronic control means connected to said proportional pressure valve for controlling the flow of hydraulic fluid therethrough to said hydraulic tank.

6. A method of controlling expansion and contraction of a double-action hydraulic working cylinder connected between a vehicle and a moveable component attached to the vehicle, said hydraulic working cylinder defining a piston chamber and a rod chamber, said piston chamber being connected to a hydraulic accumulator containing hydraulic fluid at a first pressure, said method comprising the steps of:

(a) providing a hydraulic storage tank containing hydraulic fluid, (b) pumping hydraulic fluid from said hydraulic tank to said rod chamber through a first hydraulic line, and (c) controlling return of hydraulic fluid from said first hydraulic line to said hydraulic storage tank to control speed of expansion and contraction of said working cylinder.

* * * * *